(12) United States Patent
Jang et al.

(10) Patent No.: US 8,855,416 B2
(45) Date of Patent: Oct. 7, 2014

(54) IMAGE PROCESSING METHOD AND IMAGE PROCESSING APPARATUS

(75) Inventors: Soon-geun Jang, Seongnam-si (KR); Jin-o Lee, Gyeongbuk (KR); Rae-hong Park, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 155 days.

(21) Appl. No.: 13/558,641

(22) Filed: Jul. 26, 2012

(65) Prior Publication Data
US 2013/0071024 A1  Mar. 21, 2013

(30) Foreign Application Priority Data
Sep. 21, 2011  (KR) ........................ 10-2011-0095232

(51) Int. Cl.
| | | |
|---|---|---|
| *G06K 9/00* | (2006.01) | |
| *G06T 5/20* | (2006.01) | |
| *H04N 5/213* | (2006.01) | |
| *G06T 5/00* | (2006.01) | |
| *H04N 9/64* | (2006.01) | |
| *H04N 5/217* | (2011.01) | |

(52) U.S. Cl.
CPC ...... *H04N 5/213* (2013.01); *G06T 2207/20028* (2013.01); *G06T 5/20* (2013.01); *G06T 5/002* (2013.01); *G06T 2207/20032* (2013.01); *H04N 5/217* (2013.01); *H04N 9/646* (2013.01)
USPC ........................................................ 382/167

(58) Field of Classification Search
CPC ......... G06T 5/001; G06T 5/002; G06T 5/004; G06T 5/10; G06T 5/20; G06T 7/0085; G06K 9/40; G06K 9/527; H04N 1/409; H04N 1/58; H04N 5/208; H04N 5/357; H04N 19/00793; H04N 19/00818; H04N 19/00836
See application file for complete search history.

(56) References Cited

U.S. PATENT DOCUMENTS

| | | | | |
|---|---|---|---|---|
| 6,868,187 B2* | 3/2005 | Ito | ................................. | 382/240 |
| 7,099,417 B2* | 8/2006 | Siegel et al. | .................. | 375/350 |
| 7,260,266 B2* | 8/2007 | Nakajima et al. | ............. | 382/240 |
| 7,308,152 B2* | 12/2007 | Ito | ................................. | 382/260 |
| 7,630,573 B2* | 12/2009 | Hayashi et al. | ................ | 382/261 |
| 8,094,932 B2* | 1/2012 | Kien et al. | .................... | 382/167 |
| 8,120,679 B2* | 2/2012 | Ishiga | ........................... | 348/252 |
| 8,244,034 B2* | 8/2012 | Ishiga | ........................... | 382/167 |
| 2010/0026856 A1 | 2/2010 | Jang et al. | | |
| 2010/0027904 A1 | 2/2010 | Jang | | |

FOREIGN PATENT DOCUMENTS

KR  102010013858 A  2/2010

* cited by examiner

*Primary Examiner* — Jose Couso
(74) *Attorney, Agent, or Firm* — Drinker Biddle & Reath LLP

(57) ABSTRACT

An image processing method and image processing apparatus for removing noise from an image. The image processing method includes: dividing an input image into a high frequency component and a low frequency component; removing noise from the high frequency component; and combining the low frequency component and the high frequency component from which noise is removed to form an output image. Accordingly, an image in which edge components are well preserved and a degree of color noise is reduced may be generated not only in a general environment but also in a low light level and highly sensitive environment having strong noise.

18 Claims, 9 Drawing Sheets

(a-1)

(b-1)

(a-2)

(b-2)

IMAGE PROCESSING METHOD AND IMAGE PROCESSING APPARATUS

CROSS-REFERENCE TO RELATED PATENT APPLICATION

This application claims the priority benefit of Korean Patent Application No. 10-2011-0095232, filed on Sep. 21, 2011, in the Korean Intellectual Property Office, the entirety of which is incorporated herein by reference.

BACKGROUND

1. Field of the Invention

The invention relates to an image processing method and an image processing apparatus to remove noise from an image.

2. Description of the Related Art

Examples of conventional techniques of removing noise include removing noise with respect to each subband in a transform plane using a multi-resolution image separating technique, and removing noise by dividing an image into blocks and gathering similar blocks. However, unlike noise in an actual image, conventional techniques assume independent Gaussian noise. Because noise in a captured image is signal dependent noise, it may be difficult to remove using conventional technologies.

SUMMARY

When signal dependent noise is to be removed, a multi-resolution image separating method may be used to remove noise in a lump shape having any size. However, when a transform plane such as wavelet transform is used in multi-resolution image separating methods, an artifact, such as ringing, may be generated while removing noise. Also, when multi-resolution image separating methods are used, planarization of an image may be intensified because a noise removing filter is applied to a low resolution image. Accordingly, in order to apply multi-resolution image separating methods, an image separating method capable of preserving a signal component without introducing an artifact is needed for natural noise removal. Also, a low complexity image separating method is also needed.

The invention provides an image processing method and an image processing apparatus for removing noise in an image generated not only in a general environment but also in a low light level and high image sensor sensitivity environment.

According to an aspect of the invention, there is provided an image processing method including: dividing an input image into a high frequency component and a low frequency component; removing noise from the high frequency component; and combining the low frequency component and the high frequency component from which noise is removed to form an output image.

The input image may include a luminance component and a chrominance component.

The dividing of the input image may include: separating a first low frequency component by applying a first filter to the input image; separating a second low frequency component by applying a second filter to the first low frequency component; and separating a third low frequency component by applying a third filter to the second low frequency component.

The separating of the first low frequency component may include: performing median filtering on the input image; and performing first bilateral filtering on pixels of a first area including a center pixel of the input image on which the median filtering is performed.

The separating of the second low frequency component may include performing sub-sampling and second bilateral filtering on pixels of the first low frequency component in a second area larger than the first area including the center pixel of the first low frequency component.

The separating of the second low frequency component may include performing sub-sampling and third bilateral filtering on pixels of the second low frequency component in a third area larger than the second area including the center pixel of the second low frequency component.

The dividing of the input image may include: separating a first high frequency component by calculating a first difference between the input image and the first low frequency component; separating a second high frequency component by calculating a second difference between the first low frequency component and the second low frequency component; and separating a third high frequency component by calculating a third difference between the second low frequency component and the third low frequency component.

The removing of the noise of the high frequency component may include: soft thresholding the first high frequency component; soft thresholding the second high frequency component; and soft thresholding the third high frequency component.

The soft thresholding may be performed by if the absolute value of a high frequency component is smaller than a threshold value, outputting 0; and if the absolute value of high frequency component is not smaller than the threshold value, outputting the high frequency component after subtracting from the high frequency component a difference between the threshold value and the high frequency component.

According to another aspect of the invention, there is provided an image processing apparatus including: a divider to divide an input image into a high frequency component and a low frequency component; a remover to remove noise from the high frequency component; and a combiner to combine the low frequency component and the high frequency component from which noise is removed to form an output image.

The image processing apparatus may further include a converter to convert a color signal of the input image into a luminance component and a chrominance component.

The divider may include: a first filter to separate a first low frequency component from the input image; a second filter to separate a second low frequency component from the first low frequency component; and a third filter to separate a third low frequency component from the second low frequency component.

The first filter may include: a median filter to apply median filtering to the input image; and a first bilateral filter to bilaterally filter pixels of a first area including a center pixel of the input image on which the median filtering is performed.

The second filter may include a second bilateral filter to sub-sample and to bilaterally filter pixels in a second area larger than the first area including the center pixel of the first low frequency component.

The third filter may include a third bilateral filter to sub-sample and to bilaterally filter pixels in a third area larger than the second area including the center pixel of the second low frequency component.

The divider may include: a first calculator to separate a first high frequency component by calculating a first difference between the input image and the first low frequency component; a second calculator to separate a second high frequency component by calculating a second difference between the first low frequency component and the second low frequency component; and a third calculator to separate a third high frequency component by calculating a third difference between the second low frequency component and the third low frequency component.

The remover may include: a first thresholding unit to soft threshold the first high frequency component; a second thresholding unit to soft threshold the second high frequency component; and a third thresholding unit to soft threshold the third high frequency component.

The soft thresholding may be performed by if the absolute value of a high frequency component is smaller than a threshold value, outputting 0; and if the absolute value of high frequency component is not smaller than the threshold value, outputting the high frequency component after subtracting from the high frequency component a difference between the threshold value and the high frequency component.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

Figure 1:
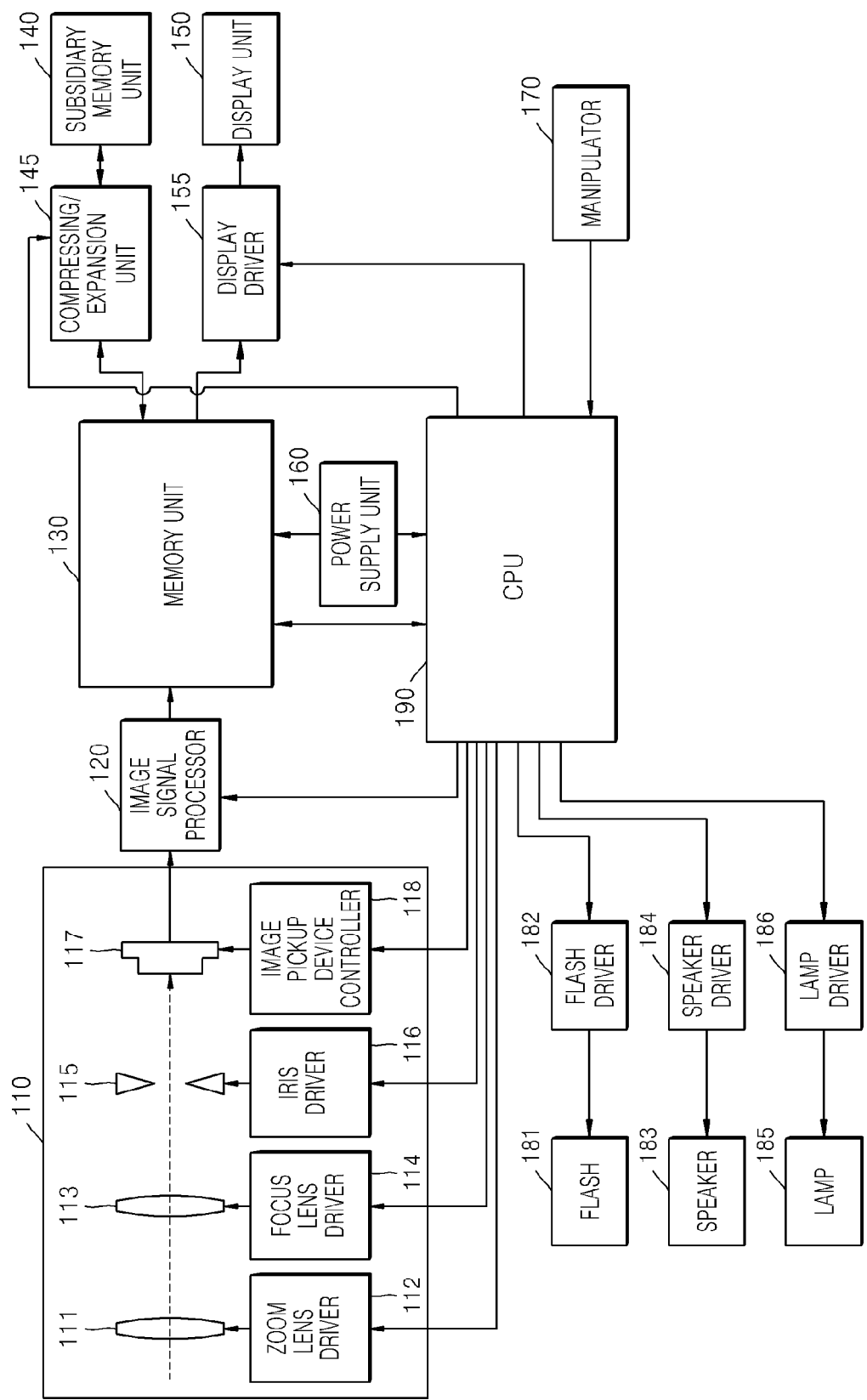
FIG. 1 is a block diagram of an image processing apparatus, according to an embodiment of the invention.

As the invention allows for various changes and numerous embodiments, particular embodiments are illustrated in the drawings and described in detail. However, this is not intended to limit the invention to these particular modes of practice, and it will to be appreciated that all changes, equivalents, and substitutes that do not depart from the spirit and technical scope of this disclosure are encompassed. In the description of the invention, certain detailed explanations of related art are omitted when it is deemed that they may unnecessarily obscure the essence of the invention.

While such terms as "first," "second," etc. may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the invention will be described below in more detail with reference to the accompanying drawings. Those components that are the same or are in correspondence are designated using the same reference numeral regardless of the figure number, and redundant explanations are omitted.

FIG. 1 is a block diagram of an image processing apparatus, according to an embodiment of the invention. In FIG. 1, a digital camera 100 is illustrated as an example of the image processing apparatus. However, the image processing apparatus is not limited to the digital camera 100, and may be a digital single-lens reflex camera (DSLR), a hybrid camera, or any other digital device capable of processing images. A structure of the digital camera 100 of FIG. 1 will now be described in detail according to operations.

When a subject is photographed, light reflected by the subject passes through a zoom lens 111 and a focus lens 113, which form all or part of an optical system of an imaging unit 110. An amount of admitted light may be adjusted according to a degree of opening and shutting of an iris 115, and then an image of the subject is formed on a light-receiving surface of an image pickup device 117. The image formed on the light-receiving surface of the image pickup device 117 is converted into an electric image signal via a photoelectric conversion process.

The image pickup device 117 may be a charge coupled device (CCD) or a complementary metal oxide semiconductor image sensor (CIS), which converts an optical signal to an electric signal. The iris 115 may be in a default state or in an open state while an auto focusing algorithm is being performed after receiving a first release signal generated in response to, for example, a half-press of a release or shutter button. Also, an exposure process may be performed by receiving a second release signal generated as the release button is fully pressed.

Locations or the like of the zoom lens 111 and the focus lens 113 are respectively controlled by a zoom lens driver 112 and a focus lens driver 114. For example, when a wide-angle zoom signal is generated, a view angle increases as a focal length of the zoom lens 111 is decreased, and when a telephoto zoom signal is generated, a view angle decreases as the focal length of the zoom lens 111 is increased. Even though the location of the focus lens 113 is adjusted while the location of the zoom lens 111 is held unchanged, the view angle is hardly affected by the location of the focus lens 113. The degree of opening and shutting or the like of the iris 115 is controlled by an iris driver 116. Sensitivity or the like of the image pickup device 117 is controlled by an image pickup device controller 118.

The zoom lens driver 112, the focus lens driver 114, the iris driver 116, and the image pickup device controller 118 control respective components according to results calculated by a central processing unit (CPU) 190 based on exposure information, focus information, etc.

When an image signal is formed, an image signal output from the image pickup device 117 is input to an image signal processor 120. When the image signal input from the image pickup device 117 is an analog signal, the image signal processor 120 converts the image signal into a digital signal, and may perform various image processes on the digital signal. Then, the digital signal is temporarily stored in a memory unit 130.

In detail, the image signal processor 120 performs auto white balance, auto exposure, or gamma correction to improve the quality of an image signal, and outputs the image signal having the improved quality. Also, the image signal processor 120 performs image processes, such as color filtering unit array interpolation, color matrix, color correction, or color enhancement.

Specifically, the image signal processor 120 converts an RGB input image signal into an YCbCr input image signal, and divides the YCbCr input image signal into a low frequency component and a high frequency component. Soft thresholding is performed on the high frequency component, and the high frequency component on which the soft thresholding was performed and the low frequency component are combined to generate a final image signal from which noise has been removed. Operations of the image signal processor 120 will be described in detail later with reference to FIGS. 2 through 5.

The memory unit 130 may include a program memory unit in which a program to control operation of the digital camera 100 is stored regardless of whether power is supplied, and a main memory unit in which the image data and other data are temporarily stored as long as power is being supplied.

The program memory unit stores an operating program and various application programs for controlling the digital camera 100. Also, the CPU 190 controls each component according to programs stored in the program memory unit.

The main memory unit temporarily stores an image signal output from the image signal processor 120 or a subsidiary memory unit 140.

The main memory unit may be directly connected to a power supply unit 160, separately from the digital camera 100 being supplied with power to be operated. Accordingly, a code pre-stored in the program memory unit may be copied to and converted into a code executable from the main memory unit so that the digital camera 100 may be quickly booted, and data stored in the main memory unit may be quickly read when the digital camera 100 is rebooted.

The image signal stored in the main memory unit is output to a display driver 155 and converted into an image signal suitable for a display output. The converted image signal may be displayed on a display unit 150 as an image. During a photographing mode, the display unit 150 may operate as a view finder for determining a photographing range by continuously displaying the image signal obtained by the image pickup device 117. Examples of the display unit 150 include a liquid crystal display (LCD), an organic light emitting display (OLED), or an electrophoretic display device (EDD).

When the image signal generated as above is recorded, the image signal is temporarily stored in the memory unit 130, and at this time, the subsidiary memory unit 140 stores not only the image signal but also various types of information about the image signal. The stored image signal and information may be output to a compressing/expansion unit 145. The compressing/expansion unit 145 forms an image file, such as a Joint Photographic Experts Group (JPEG) file, by performing a compressing process, such as an encoding process, on the image signal and information so that they are in a format suitable for efficient storage, using a compressing circuit, and the image file is stored in the subsidiary memory unit 140.

The subsidiary memory unit 140 may be a semiconductor memory such as an external flash memory, a card type flash memory having a card shape or a stick shape and freely detachable from a device, a magnetic storage media such as a hard disk or a floppy disk, or an optical storage media.

When an image is reproduced, the image file compressed and recorded on the subsidiary memory unit 140 is output to the compressing/expansion unit 145, and an image signal is extracted from the image file as the compressing/expansion unit 145 performs a decompression process, i.e., a decoding process, on the image file using a decompression circuit. Then, the image signal is output to the memory unit 130. The image signal is temporarily stored in the memory unit 130, and then may be reproduced as an image by the display unit 150 through the display driver 155.

The digital camera 100 also includes a manipulator 170 for receiving inputs from a user or the like. The manipulator 170 includes various functional elements, such as a touch screen, a multi-directional controller, a shutter release button for opening and closing a shutter to expose the image pickup device 117 to light for a predetermined time, a power supply button for controlling the supply of power to the digital camera 100, a wide angle-zoom button and a telephoto-zoom button for increasing or decreasing an angle of view, respectively, a mode selecting button for selecting a character input mode, a photographing mode, or a reproducing mode, a white balance setting button, and an exposure setting button.

Also, the digital camera 100 includes a flash 181 and a flash driver 182 for driving the flash 181. The flash 181 is a light emitting device that may be used to illuminate a subject when the subject is in a dark place.

A speaker 183 and a lamp 185 may notify the user about an operating state or the like of the digital camera 100 by respectively outputting an audio signal and a light signal. For example, if photographing conditions at a point of time when the user sets a photographing parameter and a point of time when photographing is performed are different in a manual mode, a notifying signal may be realized as an alarm or an optical signal through the speaker 183 or the lamp 185, respectively. A type and volume of the audio signal of the speaker 183 are controlled by a speaker driver 184, and light emission, a time of light emission, and a type of light emission of the lamp 185 are controlled by a lamp driver 186.

The CPU 190 performs operations according to the operating and application programs stored in the memory unit 130, temporarily stores the results of the operations, and operates the digital camera 100 as above by controlling corresponding components according to the results.

The image signal processor 120 of FIG. 1 according to an embodiment of the invention will now be described with reference to FIGS. 2 through 5.

Figure 2:
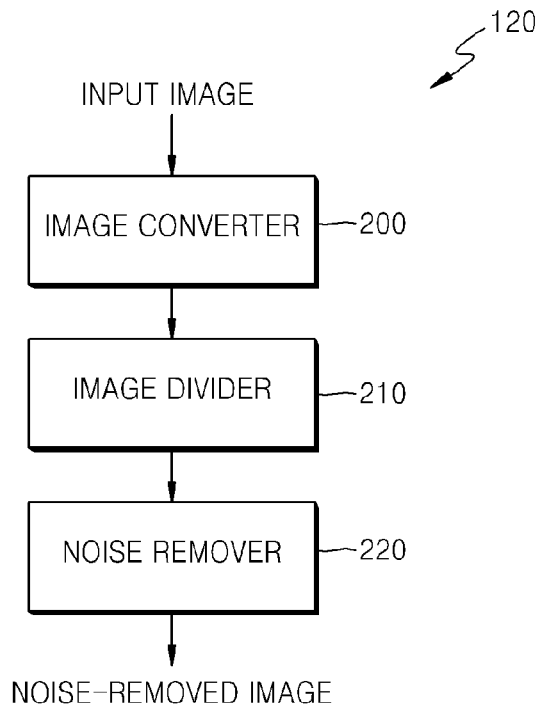
FIG. 2 is a block diagram of the image signal processor of FIG. 1, according to an embodiment of the invention.

Referring to FIG. 2, the image signal processor 120 includes an image converter 200, an image divider 210, and a noise remover 220.

The image converter 200 converts an RGB input image signal into an YCbCr input image signal, and separates the YCbCr input image signal into a luminance component and a chrominance component. Noise of a color image shows different characteristics with respect to the luminance component and the chrominance component. Luminance noise has a smaller size and more high frequency components than chrominance noise. On the other hand, chrominance noise has a larger size due to high spatial correlation and more low frequency components than luminance noise. Accordingly, the luminance noise and the chrominance noise are separately handled to increase a noise removing effect in the embodiments disclosed herein.

Figure 3:
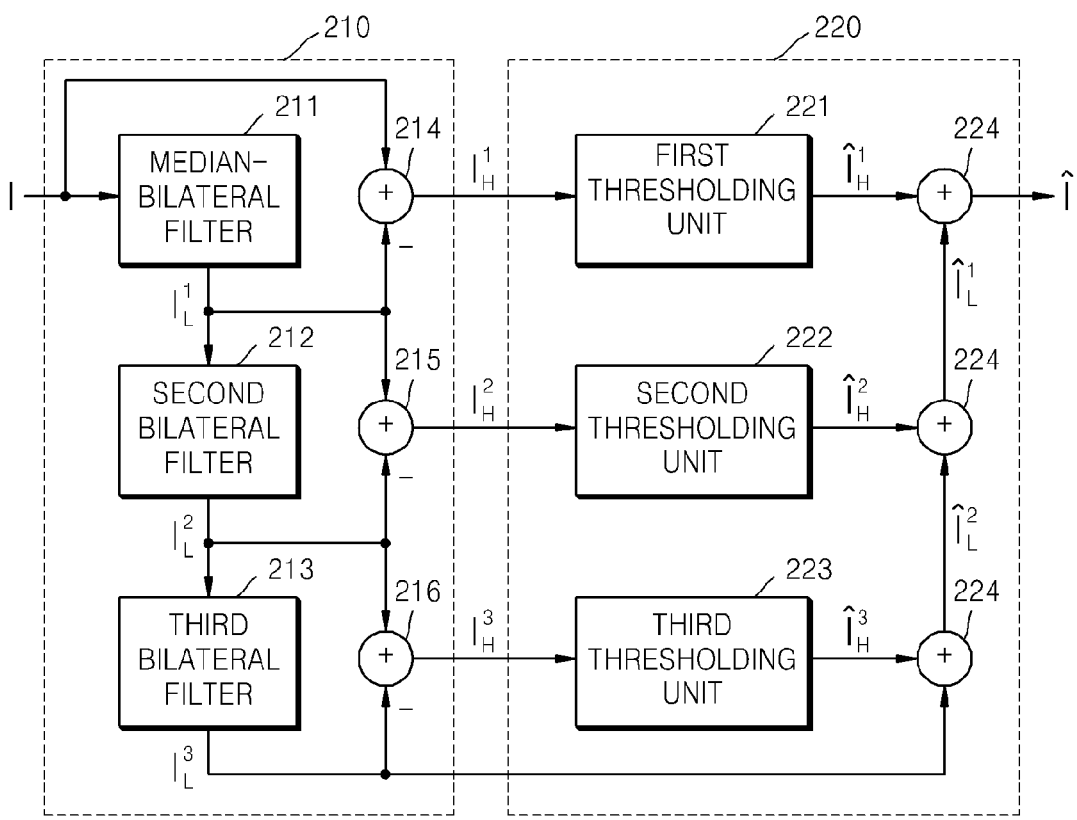
FIG. 3 is a detailed diagram of the image divider of FIG. 2.

The image divider 210 divides the YCbCr input image signal into a high frequency component and a low frequency component via a multi-resolution bilateral filtering process. FIG. 3 is a detailed diagram of the image divider 210 of FIG. 2.

Referring to FIG. 3, the image divider 210 includes a median-bilateral filter 211, a second bilateral filter 212, a third bilateral filter 213, a first calculator 214, a second calculator 215, and a third calculator 216.

Figure 4C:
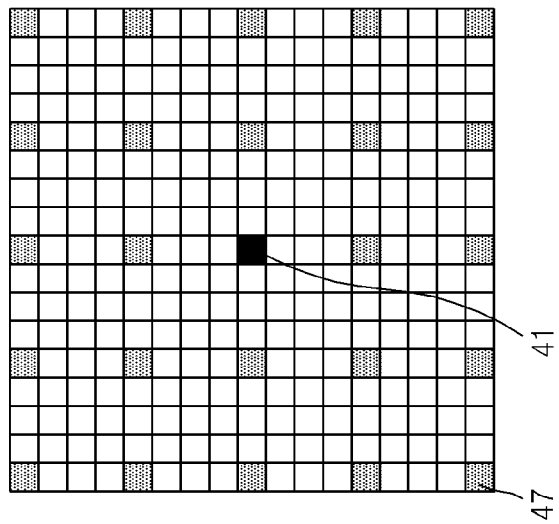
FIGS. 4A through 4C are diagrams for describing separating a low frequency component.
Figure 4B:
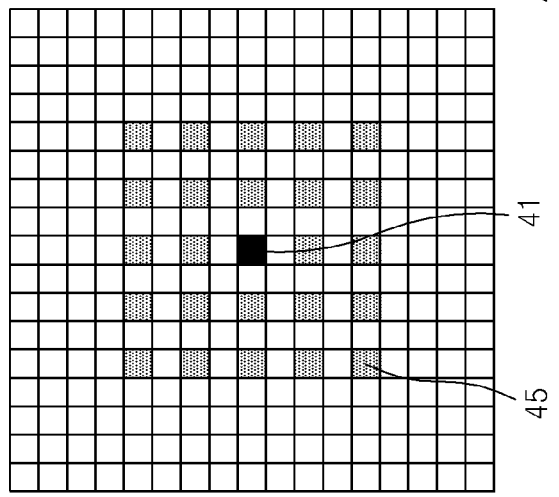
Figure 4A:
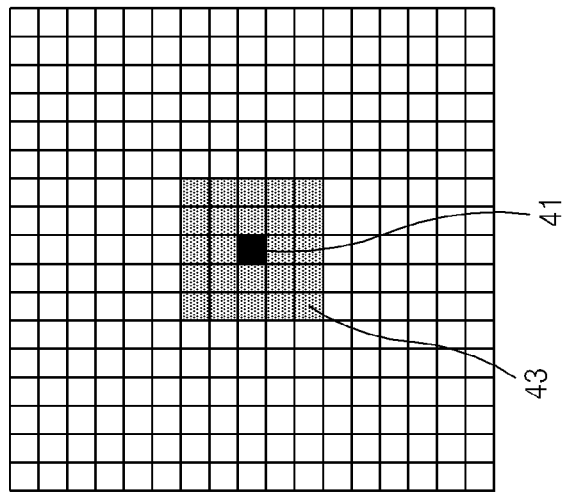

The media-bilateral filter 211 outputs a first low frequency component $I_L^1$ by performing median filtering and a first bilateral filtering on an YCbCr input image signal I. When the median filtering is performed on the YCbCr input image signal I, impulse noise is removed from the YCbCr input image signal I. Then, the first bilateral filtering is performed on the YCbCr input image signal I. As shown in FIG. 4A, the first low frequency component $I_L^1$ is formed by performing first bilateral filtering on pixels in a first area 43 (for example, 3×3) including a center pixel 41. Bilateral filter is used herein to denote a nonlinear filter that flattens an image while maintaining edge information using a difference between a spatial distance and brightness in the image. A pixel value is weight-averaged to pixel values by a bilateral filter, and thus a lower frequency component from which noise has been removed is generated. As used herein, removing noise refers to removing some or all of the noise present in an image. Thus, an image or frequency component from which noise has been removed refers to an image or frequency component in which an amount of noise has been reduced, even if not all of the noise has been removed.

The second bilateral filter 212 outputs a second low frequency component $I_L^2$ by performing second bilateral filtering on the first low frequency component $I_L^1$ output from the median-bilateral filter 211. Here, as shown in FIG. 4B, the second bilateral filter 212 outputs the second low frequency component $I_L^2$ by performing sub-sampling and second bilateral filtering on pixels of the second low frequency component $I_L^2$ in a second area 45 (for example, 9×9) larger than the first area 43 including the center pixel 41 of the first low frequency component $I_L^1$.

The third bilateral filter 213 outputs a third low frequency component $I_L^3$ by performing third bilateral filtering on the second low frequency component $I_L^2$ output from the second bilateral filter 212. As shown in FIG. 4C, the third bilateral filter 213 may output the third low frequency component $I_L^3$ by performing sub-sampling and third bilateral filtering on pixels of the third low frequency component $I_L^3$ in a third area 47 (for example, 17×17) larger than the second area 45 including the center pixel 41 of the second low frequency component $I_L^2$.

According to the current embodiment, a low frequency component from which noise lumps having irregular sizes are effectively removed is generated using a multi-resolution bilateral filter. Generally, when a multi-resolution bilateral filter is used, image processing time increases according to a size of the multi-resolution bilateral filter. However, in the current embodiment, a number of pixels used to perform filter calculations is reduced by sub-sampling the pixels at regular intervals. Accordingly, throughput is the same regardless of filter size, and a noise lump having a large size may still be effectively removed.

As such, the first low frequency component $I_L^1$, the second low frequency component $I_L^2$, and the third low frequency component $I_L^3$ are separated from the YCbCr input image signal I using the median-bilateral filter 211, the second bilateral filter 212, and the third bilateral filter 213.

Separation of high frequency components using the first calculator 214, the second calculator 215, and the third calculator 216 will be described.

Referring back to FIG. 3, the first calculator 214 generates a first high frequency component $I_H^1$ by calculating a difference between the YCbCr input image signal I and the first low frequency component $I_L^1$.

The second calculator 215 generates a second high frequency component $I_H^2$ by calculating a difference between the first low frequency component $I_L^1$ and the second low frequency component $I_L^2$.

The third calculator 216 generates a third high frequency component $I_H^3$ by calculating a difference between the second low frequency component $I_L^2$ and the third low frequency component $I_L^3$.

As such, high frequency components are generated using low frequency components generated according to sizes of the bilateral filters, and include noises according to characteristics of the bilateral filters.

The noise remover 220 for removing noise from high frequency components will now be described with reference to FIG. 3.

Referring to FIG. 3, the noise remover 220 includes a first thresholding unit 221, a second thresholding unit 222, a third thresholding unit 223, and an adder 224. The thresholding units 222-224 perform soft thresholding, which is defined herein by the following mathematical expression:

$$f(x) = \begin{cases} \text{sign}(x)(|x| - (|x| - t)) & \text{when } |x| \geq t \\ 0 & \text{when } |x| < t \end{cases} \quad \text{EQN (1)}$$

where x is the input, f(x) is the output, t is the threshold, and sign(x) is the sign (i.e., + or −) of the input x.

As defined above in EQN (1), the first thresholding unit 221 compares the absolute value of the first high frequency component $I_H^1$ and a first threshold value (for example, 5 to 10), and when the absolute value of the first high frequency component $I_H^1$ is smaller than the first threshold value, determines that the first high frequency component $I_H^1$ is noise and outputs 0. Alternatively, when the absolute value of the first high frequency component $I_H^1$ is not smaller than the first threshold value, the first thresholding unit 221 determines that the first high frequency component $I_H^1$ is an image signal, and outputs a first high frequency component $\hat{I}_H^1$ from which noise is removed by subtracting from the first high frequency component $I_H^1$ a difference between the first high frequency component $I_H^1$ and the first threshold value.

As defined above in EQN (1), the second thresholding unit 222 compares the absolute value of the second high frequency component $I_H^2$ and a second threshold value, and when the absolute value of the second high frequency component $I_H^2$ is smaller than the second threshold value, determines that the second high frequency component $I_H^2$ is noise and outputs 0. Alternatively, when the absolute value of the second high frequency component $I_H^2$ is not smaller than the threshold value, the second thresholding unit 222 determines that the second high frequency component $I_H^2$ is an image signal, and outputs a second high frequency component $\hat{I}_H^2$ from which noise is removed by subtracting from the second high frequency component $I_H^2$ a difference between the second high frequency component $I_H^2$ and the second threshold value.

As defined above in EQN (1), the third thresholding unit 223 compares the absolute value of the third high frequency component $I_H^3$ and a third threshold value, and when the absolute value of the third high frequency component $I_H^3$ is smaller than the third threshold value, determines that the third high frequency component $I_H^3$ is noise and outputs 0. Alternatively, when the absolute value of the third high frequency component $I_H^3$ is not smaller than the third threshold value, the third thresholding unit 223 determines that the third high frequency component $I_H^3$ is an image signal, and outputs a third high frequency component $\hat{I}_H^3$ from which noise is removed by subtracting from the third high frequency component $I_H^3$ a difference between the third high frequency component $I_H^3$ and the third threshold value. The first, second and third threshold values may be the same or different values.

The adder 224 is a unit for outputting an image signal $\hat{I}$ from which final noise is removed, and thus adds the first low frequency component $I_L^1$, the second low frequency component $I_L^2$, and the third low frequency component $I_L^3$, from which noise has been removed via multi-resolution bilateral filtering by the image divider 210, and the first high frequency component $\hat{I}_H^1$, the second high frequency component $\hat{I}_H^2$, and the third high frequency component $\hat{I}_H^3$, from which noise has been removed via thresholding.

Figure 5A:
FIGS. 5A and 5B show conventional noise-removed images and noise-removed images according to embodiments of the invention.
Figure 5A:
Figure 5B:
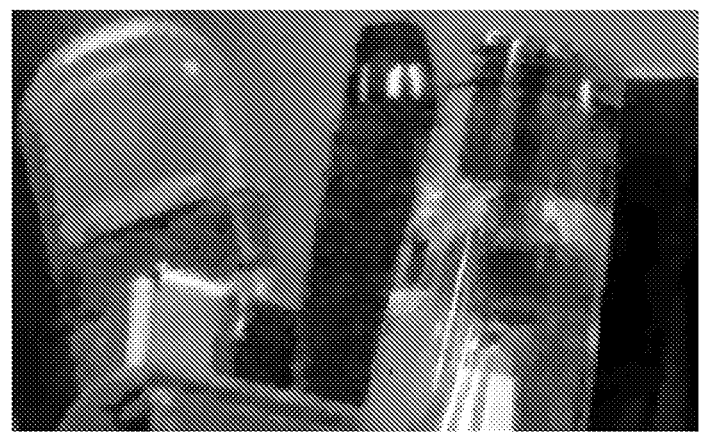
Figure 5B:
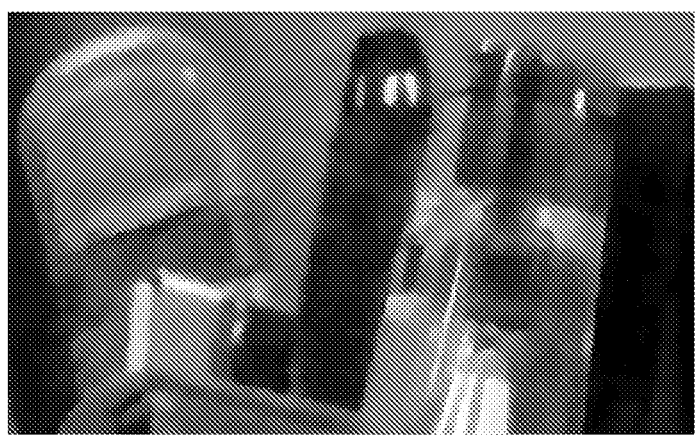

FIG. 5A (a-1) shows an image having noise removed using conventional methods, and FIG. 5A (b-1) shows an image having noise removed according to embodiments of the invention. FIG. 5A (a-1) is a result image obtained by applying a conventional multi-resolution bilateral filtering method, and FIG. 5B (a-2) is an enlarged image of the pens at the center of the result image of FIG. 5A (a-1). Referring to FIG. 5B (a-2), color noise is still left, and edge components of the pens are damaged and thus have saw tooth or jagged appearance. Also, the enlarged image of FIG. 5B (a-2) is excessively flattened, and thus unnatural. FIG. 5A (b-1) is a result image obtained by applying the noise removing method of the current embodiment, and FIG. 5B (b-2) is an enlarged image of the pens at the center of the result image of FIG. 5A (b-1). Comparing FIG. 5B (a-2) and FIG. 5B (b-2), edge components of the enlarged image of FIG. 5B (b-2) are well preserved and color noise is better removed in the enlarged image of FIG. 5B (b-2).

According to the current embodiment, noise components may be more effectively removed while reducing loss of details and edge components of color image data obtained using a still image capturing device, such as a digital camera or a camcorder, regardless of the sensitivity used to obtain an image.

An image processing method will now be described in detail with reference to FIGS. 6 through 9.

Figure 6:
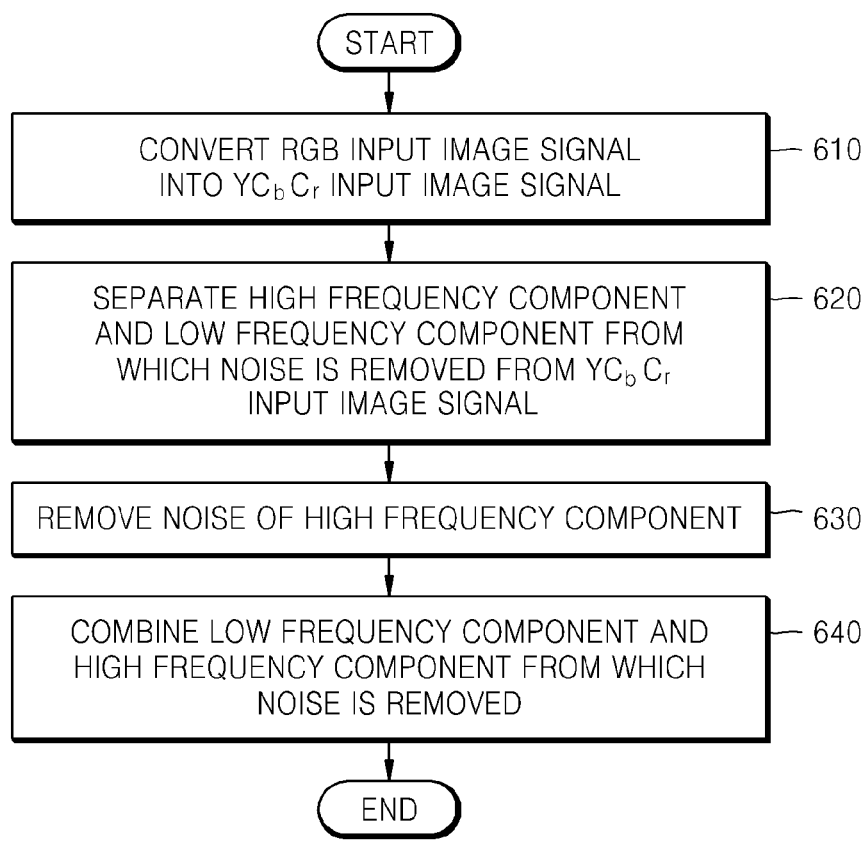
FIG. 6 is a flowchart illustrating an image processing method, according to an embodiment of the invention.

FIG. 6 is a flowchart illustrating an image processing method according to an embodiment of the invention. Referring to FIG. 6, an RGB input image signal is converted into an YCbCr input image signal in operation 610.

Then, a high frequency component and a low frequency component from which noise is removed are separated from the YCbCr input image signal in operation 620.

Figure 7:
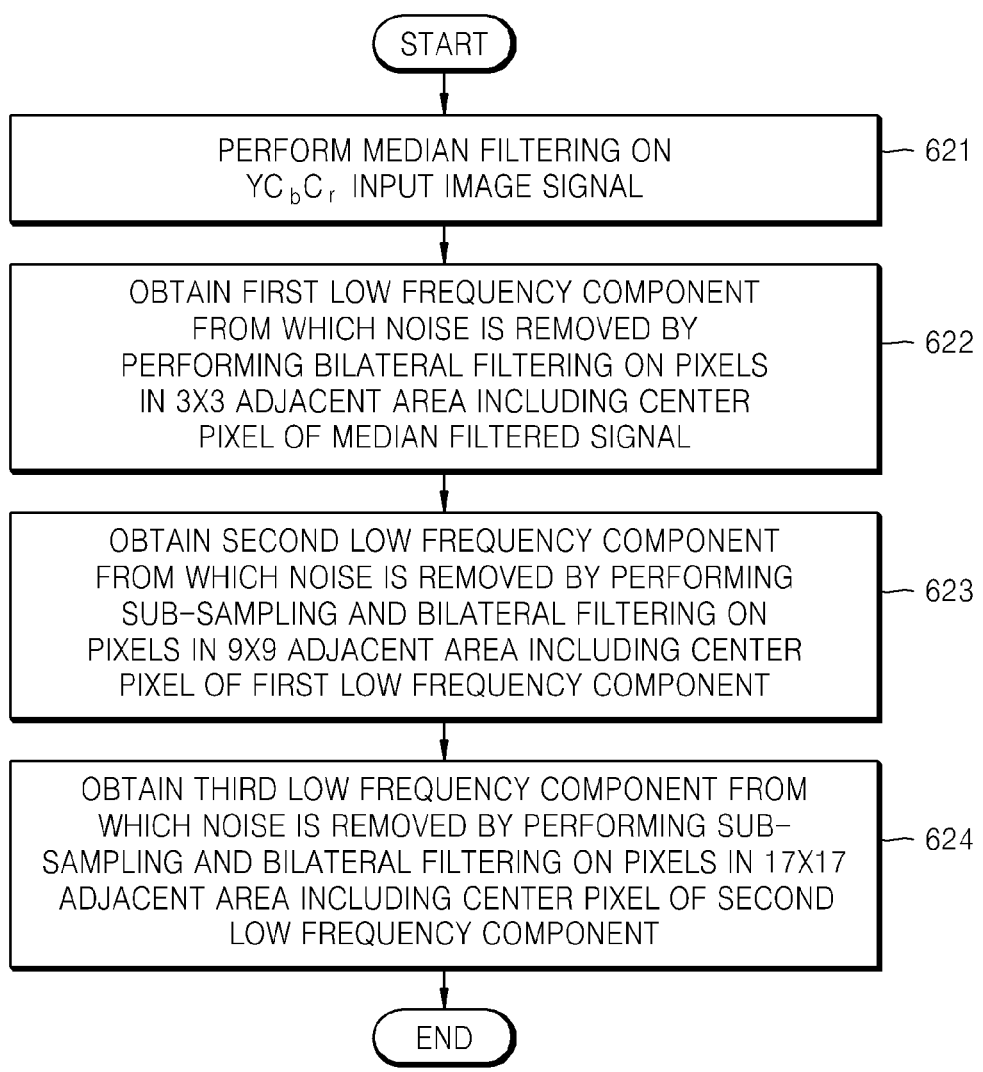
FIG. 7 is a flowchart illustrating a method of separating a low frequency component performed in operation 620 of FIG. 6.

FIG. 7 is a flowchart illustrating a method of separating a low frequency component performed in operation 620 of FIG. 6. Referring to FIG. 7, impulse noise is removed by performing median filtering of the YCbCr input image signal in operation 621.

Then, a first low frequency component from which noise is removed is obtained by performing bilateral filtering on pixels in a 3×3 area including a center pixel of the median filtered signal, in operation 622.

Next, a second low frequency component from which noise is removed is obtained by performing sub-sampling and bilateral filtering on pixels in a 9×9 area including the center pixel of the first low frequency component from which noise is removed, in operation 623.

Then, a third low frequency component from which noise is removed is obtained by performing sub-sampling and bilateral filtering on pixels in a 17×17 area including the center pixel of the second low frequency component from which noise is removed, in operation 624.

Generally, when a multi-resolution bilateral filter is used, image processing time increases according to the size of the multi-resolution bilateral filter. However, in the current embodiment, a number of pixels used in actual filter calculations is fixed or reduced by sub-sampling the pixels at regular intervals. Accordingly, throughput is the same regardless of the size of filter, and a noise lump having a large size may still be effectively removed.

Figure 8:
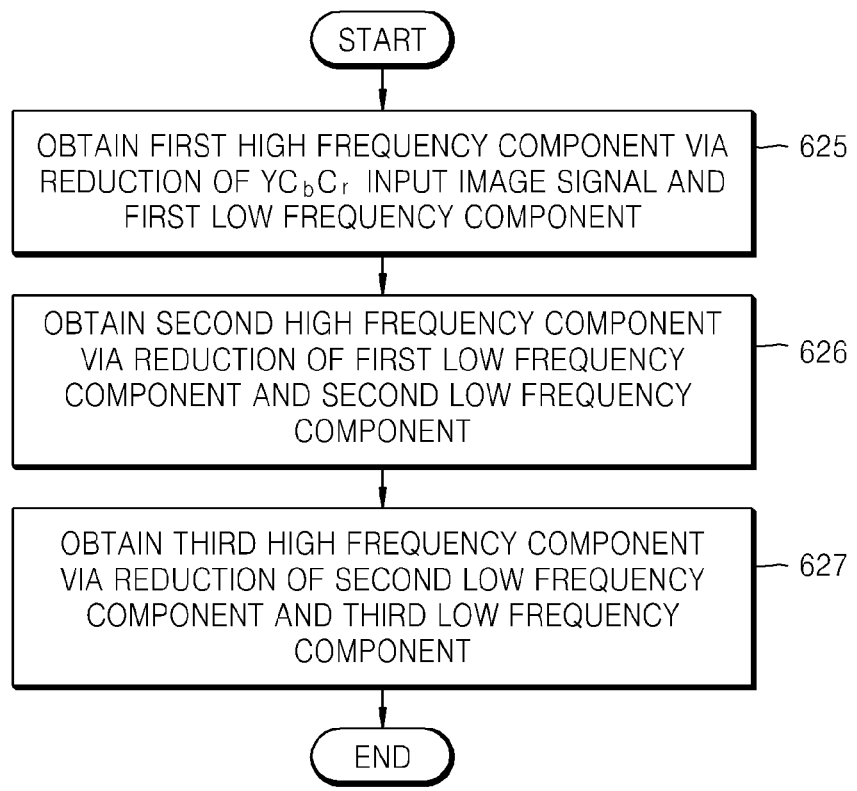
FIG. 8 is a flowchart illustrating a method of separating a high frequency component performed in operation 620 of FIG. 6.

FIG. 8 is a flowchart illustrating a method of separating a high frequency component performed in operation 620 of FIG. 6. Referring to FIG. 8, a first high frequency component is obtained by subtracting from the YCbCr input image signal the first low frequency component, in operation 625.

Then, a second high frequency component is obtained by subtracting from the first low frequency component the second low frequency component in operation 626.

Next, a third high frequency component is obtained by subtracting from the second low frequency component the third low frequency component in operation 627.

As such, high frequency components are generated using low frequency components generated by progressively increasing bilateral filter size, and the high frequency components include noise according to characteristics of the bilateral filters.

Referring back to FIG. 6, noise in the high frequency component is removed after the high frequency component and the low frequency component from which noise is removed are separated from the YCbCr input image signal, in operation 630.

Figure 9:
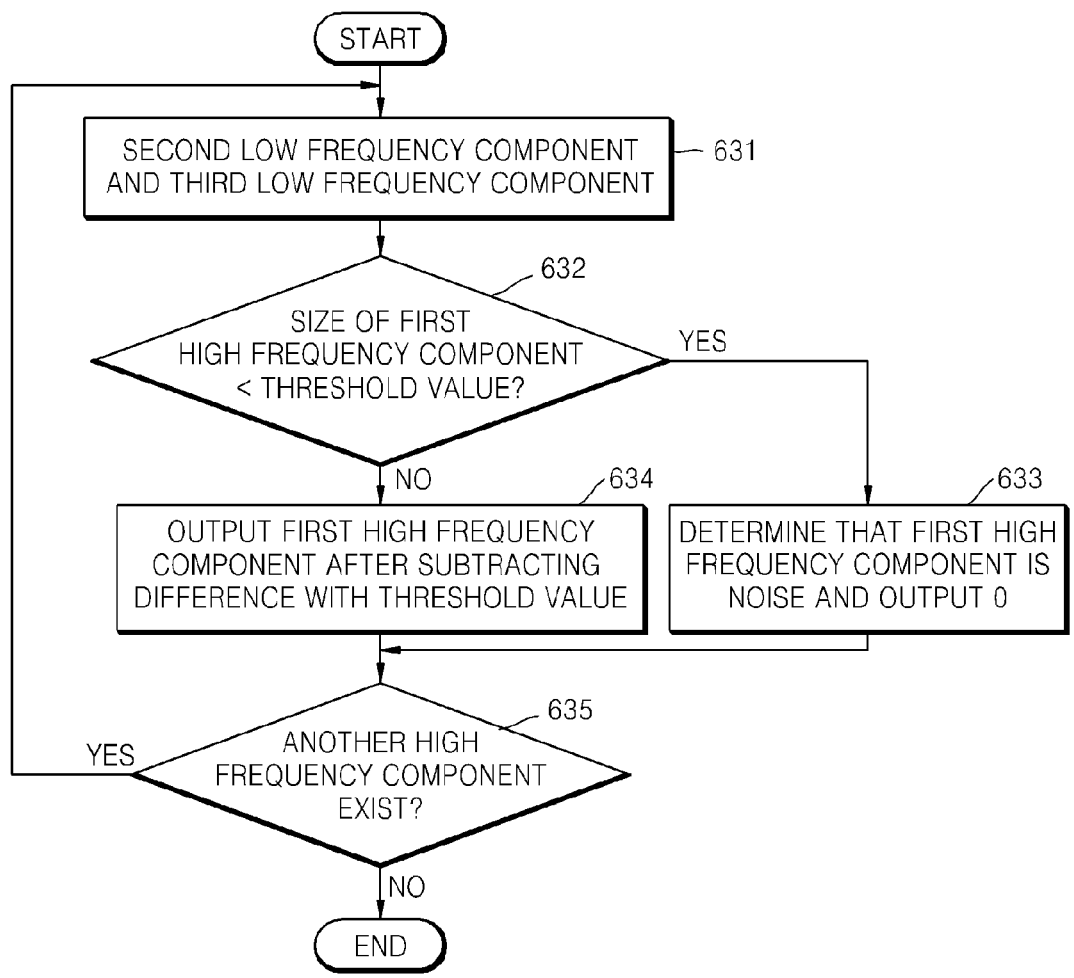
FIG. 9 is a flowchart illustrating a method of removing noise of a high frequency component performed in operation 630 of FIG. 6.

FIG. 9 is a flowchart illustrating a method of removing noise in high frequency components performed in operation 630 of FIG. 6. The method of FIG. 9 uses soft thresholding, and threshold values may be set to high or low values, for example a value between 5 and 10. While in the example of FIG. 9, the same threshold value is used for the different high frequency components, different threshold values may be used.

Referring to FIG. 9, a value of the high frequency component and a threshold value are compared in operation 631, and it is determined whether the value of the first high frequency component is smaller than the threshold value in operation 632.

If it is determined that the absolute value of the first high frequency component is smaller than the threshold value, the first high frequency component is determined to be noise and 0 is output in operation 633.

However, if it is determined that the absolute value of the first high frequency component is not smaller than the threshold value, the first high frequency component is determined to be an image signal, and a first high frequency component from which noise is removed is output by subtracting a difference between the first high frequency component and the threshold value from the first high frequency component, in operation 634.

If it is determined that there is another high frequency component in operation 635, operations 631 through 635 are repeated, i.e., second and third high frequency components from which noise is removed are output in the same manner.

Referring back to FIG. 6, an image signal from which final noise is removed is output in operation 640 by adding the first through third low frequency components from which noise is removed via multi-resolution bilateral filtering and the first through third high frequency components from which noise is removed via soft thresholding.

As described above, according to the embodiments of the invention, an image in which edge components are well preserved and a degree of color noise reduced can be generated not only in a general environment but also in a low light level and highly sensitive environment having strong noise.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

What is claimed is:

1. An image processing method comprising:
dividing using a processor an input image into low frequency components from which noise is removed and high frequency components;
removing noise from the high frequency components; and
combining the low frequency components and the high frequency components from which noise is removed to form an output image,
wherein the dividing of the input image comprises:
obtaining the low frequency components from which noise is removed, from the input image;
obtaining the high frequency components by calculating a difference between the input image and the low frequency components.

2. The image processing method of claim 1, wherein the input image includes a luminance component and a chrominance component.

3. The image processing method of claim 1, wherein the dividing of the input image comprises:
separating a first low frequency component by applying a first filter to the input image;
separating a second low frequency component by applying a second filter to the first low frequency component; and
separating a third low frequency component by applying a third filter to the second low frequency component.

4. The image processing method of claim 3, wherein the separating of the first low frequency component comprises:
performing median filtering on the input image; and
performing first bilateral filtering on pixels of a first area including a center pixel of the input image on which the median filtering is performed.

5. The image processing method of claim 4, wherein the separating of the second low frequency component comprises:
performing sub-sampling; and
performing second bilateral filtering on pixels of the first low frequency component in a second area larger than the first area including the center pixel of the first low frequency component.

6. The image processing method of claim 5, wherein the separating of the third low frequency component comprises:
performing second sub-sampling; and
performing third bilateral filtering on pixels of the second low frequency component in a third area larger than the second area including the center pixel of the second low frequency component.

7. The image processing method of claim 3, wherein the dividing of the input image comprises:
separating a first high frequency component by calculating a first difference between the input image and the first low frequency component;
separating a second high frequency component by calculating a second difference between the first low frequency component and the second low frequency component; and
separating a third high frequency component by calculating a third difference between the second low frequency component and the third low frequency component.

8. The image processing method of claim 7, wherein the removing of the noise of the high frequency component comprises:
soft thresholding the first high frequency component;
soft thresholding the second high frequency component; and
soft thresholding the third high frequency component.

9. The image processing method of claim 8, wherein the soft thresholding is performed by:
if the absolute value of a high frequency component is smaller than a threshold value, outputting 0, and
if the absolute value of the high frequency component is not smaller than the threshold value, outputting the high frequency component after subtracting from the high frequency component a difference between the threshold value and the high frequency component.

10. An image processing apparatus comprising:
an image signal processor;
an image signal dividing algorithm that is stored in a memory, runs on the processor and divides an input image into low frequency components from which noise is removed and high frequency components;
a noise removing unit that removes noise from the high frequency components; and
an image signal combining unit that combines the low frequency components and the high frequency components from which noise is removed to form an output image,
wherein the dividing of the input image comprises:
obtaining the low frequency components from which noise is removed, from the input image;
obtaining the high frequency components by calculating a difference between the input image and the low frequency components.

11. The image processing apparatus of claim 10, further comprising an image signal converting unit that converts a color signal of the input image into a luminance component and a chrominance component.

12. The image processing apparatus of claim 10, wherein the image signal dividing unit comprises:
a first filter to separate a first low frequency component from the input image;
a second filter to separate a second low frequency component from the first low frequency component; and
a third filter to separate a third low frequency component from the second low frequency component.

13. The image processing apparatus of claim 12, wherein the first filter comprises:
a median filter to apply median filtering to the input image; and
a first bilateral filter to bilaterally filter pixels of a first area including a center pixel of the input image on which the median filtering is performed.

14. The image processing apparatus of claim 13, wherein the second filter comprises a second bilateral filter to sub-sample and to bilaterally filter pixels of the first low frequency component in a second area larger than the first area including the center pixel of the first low frequency component.

15. The image processing apparatus of claim 14, wherein the third filter comprises a third bilateral filter to sub-sample and to bilaterally filter pixels of the second low frequency component in a third area larger than the second area including the center pixel of the second low frequency component.

16. The image processing apparatus of claim 12, wherein the image signal dividing unit comprises:
a first calculator unit to separate a first high frequency component by calculating a first difference between the input image and the first low frequency component;
a second calculator unit to separate a second high frequency component by calculating a second difference between the first low frequency component and the second low frequency component; and
a third calculator unit to separate a third high frequency component by calculating a third difference between the second low frequency component and the third low frequency component.

17. The image processing apparatus of claim 16, wherein the noise removing unit comprises:
a first thresholding unit to soft threshold the first high frequency component;
a second thresholding unit to soft threshold the second high frequency component; and
a third thresholding unit to soft threshold on the third high frequency component.

18. The image processing apparatus of claim 17, wherein the soft thresholding is performed by:
if the absolute value of a high frequency component is smaller than a threshold value, outputting 0, and
if the absolute value of the high frequency component is not smaller than the threshold value, outputting the high frequency component after subtracting from the high frequency component a difference between the threshold value and the high frequency component.

* * * * *